US012587130B2

(12) United States Patent
Lisoski et al.

(10) Patent No.: US 12,587,130 B2
(45) Date of Patent: Mar. 24, 2026

(54) METHOD OF OPERATING A HIGH ALTITUDE LONG ENDURANCE AIRCRAFT FOR MAXIMIZING SOLAR CAPTURE

(71) Applicant: AEROVIRONMENT, INC., Arlington, VA (US)

(72) Inventors: Derek Lisoski, Simi Valley, CA (US); Bart Dean Hibbs, Simi Valley, CA (US)

(73) Assignee: AeroVironment, Inc., Arlington, VA (US)

( * ) Notice: Subject to any disclaimer, the term of this patent is extended or adjusted under 35 U.S.C. 154(b) by 371 days.

(21) Appl. No.: 17/605,929

(22) PCT Filed: Apr. 23, 2020

(86) PCT No.: PCT/US2020/029658
§ 371 (c)(1),
(2) Date: Oct. 22, 2021

(87) PCT Pub. No.: WO2021/011046
PCT Pub. Date: Jan. 21, 2021

(65) Prior Publication Data
US 2022/0321055 A1 Oct. 6, 2022

Related U.S. Application Data

(60) Provisional application No. 62/854,874, filed on May 30, 2019, provisional application No. 62/838,833, (Continued)

(51) Int. Cl.
*H02S 20/32* (2014.01)
*B64U 10/25* (2023.01)
(Continued)

(52) U.S. Cl.
CPC .............. *H02S 20/32* (2014.12); *B64U 50/19* (2023.01); *B64U 50/31* (2023.01); *G05D 1/0005* (2013.01); *G05D 1/0808* (2013.01); *B64U 10/25* (2023.01)

(58) Field of Classification Search
CPC ...... H02S 20/32; B64U 50/31; G05D 1/0005; G05D 1/0808
See application file for complete search history.

(56) References Cited

U.S. PATENT DOCUMENTS

| | | | |
|---|---|---|---|
| 2,405,544 A | 8/1946 | Anjeskey |
| 2,431,589 A | 11/1947 | Shuler |

(Continued)

FOREIGN PATENT DOCUMENTS

| | | |
|---|---|---|
| AU | 2007200943 A1 | 9/2007 |
| DE | 102017102481 A1 | 8/2018 |

(Continued)

OTHER PUBLICATIONS

Fayyaz Muhammad et al.:"Survey and future directions of fault-tolerant distributed computing on board spacecraft", Advances in Space Research, Elsevier, Amsterdam, NL, vol. 58, No. 11, Aug. 22, 2016 (Aug. 22, 2016), pp. 2352-2375, XP029801074, ISSN: 0273-1177, DOI: 10.1016/J.ASR.2016.08.017*p. 2354, section 2.2 p. 2355, Fig. 1 and left col. 2nd paragraph p. 2360-2361:section 4.2.1.*.

(Continued)

*Primary Examiner* — Andrew J Cromer
(74) *Attorney, Agent, or Firm* — Command IP LLP; Michael Zarrabian; Eric Aagaard

(57) ABSTRACT

Systems, devices, and methods including at least one flight control computer (FCC) associated with at least one UAV, where the at least one FCC is configured to: determine a direction of travel of the at least one UAV relative to the Sun;

(Continued)

TOWARDS THE SUN adjust a UAV airspeed to a first airspeed if the determined direction of travel is towards the Sun; and adjust the UAV airspeed to a second airspeed if the determined direction of travel is away the Sun; where the first airspeed is greater than the second airspeed to maximize solar capture of a solar array covering at least a portion of the UAV.

18 Claims, 9 Drawing Sheets

Related U.S. Application Data filed on Apr. 25, 2019, provisional application No. 62/838,783, filed on Apr. 25, 2019.

(51) Int. Cl.
| | |
|---|---|
| B64U 50/19 | (2023.01) |
| B64U 50/31 | (2023.01) |
| G05D 1/00 | (2024.01) |

(56) References Cited

U.S. PATENT DOCUMENTS

| | | | |
|---|---|---|---|
| 2,478,758 A | 8/1949 | Frieder et al. | |
| 2,712,874 A | 7/1955 | Murray | |
| 2,815,132 A | 12/1957 | Ben | |
| 2,898,058 A | 8/1959 | Del | |
| 3,012,737 A | 12/1961 | Dodd | |
| 3,306,578 A | 2/1967 | Meeks et al. | |
| 3,640,491 A | 2/1972 | Harrison | |
| 3,671,013 A | 6/1972 | Everson, Jr. et al. | |
| 4,269,374 A | 5/1981 | Miller | |
| 4,440,265 A | 4/1984 | Spagnoli | |
| 4,461,455 A | 7/1984 | Mills et al. | |
| 4,810,151 A | 3/1989 | Shem | |
| 4,916,612 A | 4/1990 | Chin et al. | |
| 5,175,712 A | 12/1992 | Vaccaro et al. | |
| 5,349,654 A | 9/1994 | Bond et al. | |
| 5,383,758 A | 1/1995 | Patrick | |
| 5,552,985 A | 9/1996 | Hori | |
| 5,662,315 A | 9/1997 | Neiss et al. | |
| 5,810,284 A | 9/1998 | Hibbs et al. | |
| 5,903,717 A | 5/1999 | Wardrop | |
| 6,024,348 A | 2/2000 | Ventura et al. | |
| 6,056,237 A | 5/2000 | Woodland | |
| 6,314,630 B1 | 11/2001 | Munk et al. | |
| 6,550,018 B1 | 4/2003 | Abonamah et al. | |
| 6,684,275 B1 | 1/2004 | Goldstein | |
| 6,697,973 B1 | 2/2004 | Baumeister, IV et al. | |
| 6,808,143 B2 | 10/2004 | Munk et al. | |
| 6,979,288 B2 | 12/2005 | Hazlehurst et al. | |
| 7,319,738 B2 | 1/2008 | Lasiuk et al. | |
| 7,461,711 B2 | 12/2008 | McCrary et al. | |
| 7,874,053 B2 | 1/2011 | Stangel | |
| 7,917,242 B2 | 3/2011 | Jones | |
| 8,005,563 B2 | 8/2011 | Cobb et al. | |
| 8,020,816 B2 | 9/2011 | Laitila et al. | |
| 8,066,267 B2 | 11/2011 | Schaerer | |
| 8,141,819 B2 | 3/2012 | Brock | |
| 8,191,831 B2 | 6/2012 | Nadir | |
| 8,262,050 B2 | 9/2012 | Linz | |
| 8,577,519 B1 | 11/2013 | Varnavas et al. | |
| 8,661,684 B1 | 3/2014 | Boyd et al. | |
| 8,948,960 B2 | 2/2015 | Griffith | |
| 9,126,698 B2 | 9/2015 | Spinazze et al. | |
| 9,486,917 B2 | 11/2016 | Reid et al. | |
| 9,654,200 B2 | 5/2017 | Mazzarella et al. | |
| 9,694,894 B2 | 7/2017 | Deakin | |
| 9,708,079 B2 | 7/2017 | DesJardien et al. | |
| 9,776,330 B2 | 10/2017 | Day et al. | |
| 9,895,741 B2 | 2/2018 | Oberoi et al. | |
| 9,957,064 B2 | 5/2018 | Miller et al. | |
| 9,959,773 B2 | 5/2018 | Raptopoulos et al. | |
| 10,005,541 B2 | 6/2018 | Karem et al. | |
| 10,017,277 B2 | 7/2018 | DesJardien et al. | |
| 10,095,242 B1 | 10/2018 | Novak | |
| 10,155,588 B2 | 12/2018 | Fisher et al. | |
| 10,391,543 B2 | 8/2019 | Boyd et al. | |
| 10,407,087 B1 | 9/2019 | Baker et al. | |
| 10,427,254 B2 | 10/2019 | Day et al. | |
| 10,476,296 B1 * | 11/2019 | Rausch | B64U 50/31 |
| 10,640,297 B2 | 5/2020 | Kilibarda et al. | |
| 10,894,617 B2 | 1/2021 | Liaqat et al. | |
| 10,907,764 B2 | 2/2021 | Waller et al. | |
| 10,982,805 B2 | 4/2021 | Burton et al. | |
| 11,180,264 B2 | 11/2021 | Best et al. | |
| 2003/0183451 A1 | 10/2003 | Huang | |
| 2005/0034015 A1 | 2/2005 | Hashimoto et al. | |
| 2005/0044700 A1 | 3/2005 | Ghuman et al. | |
| 2005/0116105 A1 | 6/2005 | Munk et al. | |
| 2006/0266885 A1 | 11/2006 | Hardaker et al. | |
| 2006/0278757 A1 | 12/2006 | Kelleher | |
| 2007/0131103 A1 | 6/2007 | McClellan et al. | |
| 2007/0168711 A1 | 7/2007 | Chen | |
| 2008/0033604 A1 | 2/2008 | Margolin | |
| 2009/0044050 A1 | 2/2009 | Maimone et al. | |
| 2009/0236470 A1 | 9/2009 | Goossen et al. | |
| 2010/0168939 A1 | 7/2010 | Doeppner et al. | |
| 2010/0217437 A1 | 8/2010 | Sarh et al. | |
| 2010/0292873 A1 | 11/2010 | Duggan et al. | |
| 2011/0000082 A1 | 1/2011 | Yamashita et al. | |
| 2011/0024587 A1 | 2/2011 | Tsai | |
| 2011/0054694 A1 | 3/2011 | Munk | |
| 2011/0282502 A1 * | 11/2011 | Fife | G05F 1/67 |
| | | | 700/287 |
| 2012/0110374 A1 | 5/2012 | Brewerton et al. | |
| 2012/0216384 A1 | 8/2012 | Immekus | |
| 2012/0273631 A1 | 11/2012 | Deros | |
| 2013/0062457 A1 | 3/2013 | Deakin | |
| 2013/0135030 A1 | 5/2013 | Barrenscheen et al. | |
| 2013/0158697 A1 | 6/2013 | Stone et al. | |
| 2014/0001318 A1 | 1/2014 | Ehrenleitner | |
| 2014/0021288 A1 | 1/2014 | Elson et al. | |
| 2014/0032034 A1 | 1/2014 | Raptopoulos et al. | |
| 2014/0188776 A1 | 7/2014 | Shuster et al. | |
| 2014/0257684 A1 | 9/2014 | Wilder et al. | |
| 2014/0316616 A1 | 10/2014 | Kugelmass | |
| 2014/0353894 A1 | 12/2014 | DesJardien et al. | |
| 2015/0066248 A1 | 3/2015 | Arbeit et al. | |
| 2015/0097071 A1 | 4/2015 | Frolov et al. | |
| 2015/0097079 A1 | 4/2015 | Frolov et al. | |
| 2015/0102172 A1 | 4/2015 | Thurn | |
| 2015/0115106 A1 | 4/2015 | Coffey et al. | |
| 2015/0203200 A1 | 7/2015 | Bye et al. | |
| 2015/0266575 A1 | 9/2015 | Borko | |
| 2015/0314741 A1 | 11/2015 | Ueta et al. | |
| 2015/0327136 A1 | 11/2015 | Kim et al. | |
| 2015/0336671 A1 | 11/2015 | Winn et al. | |
| 2016/0009390 A1 | 1/2016 | Kugelmass et al. | |
| 2016/0009402 A1 | 1/2016 | Hunter | |
| 2016/0039541 A1 | 2/2016 | Beardsley et al. | |
| 2016/0075452 A1 | 3/2016 | Robles et al. | |
| 2016/0257426 A1 | 9/2016 | Mozer | |
| 2016/0307448 A1 | 10/2016 | Salnikov et al. | |
| 2016/0347467 A1 | 12/2016 | Salesse-Lavergne et al. | |
| 2016/0368590 A1 | 12/2016 | Karem et al. | |
| 2017/0069145 A1 | 3/2017 | Dorkel et al. | |
| 2017/0120443 A1 | 5/2017 | Kang et al. | |
| 2017/0137138 A9 | 5/2017 | Hunter | |
| 2017/0144776 A1 | 5/2017 | Fisher et al. | |
| 2017/0195048 A1 | 7/2017 | Sham | |
| 2017/0248125 A1 | 8/2017 | Luchsinger et al. | |
| 2017/0334559 A1 | 11/2017 | Bouffard et al. | |
| 2018/0009764 A1 | 1/2018 | Mitchell et al. | |
| 2018/0048160 A1 | 2/2018 | Narla et al. | |
| 2018/0090016 A1 | 3/2018 | Nishi et al. | |
| 2018/0099764 A1 | 4/2018 | Schill et al. | |
| 2018/0126851 A1 | 5/2018 | Koebler et al. | |
| 2018/0130363 A1 | 5/2018 | Yvetot et al. | |
| 2018/0273170 A1 | 9/2018 | D'Sa et al. | |
| 2018/0305191 A1 | 10/2018 | Renquist | |
| 2018/0362158 A1 | 12/2018 | Zhang et al. | |

(56) References Cited

U.S. PATENT DOCUMENTS

| | | | |
|---|---|---|---|
| 2019/0107408 A1* | 4/2019 | Stroman | ............. G05D 1/0005 |
| 2019/0161190 A1 | 5/2019 | Gil et al. | |
| 2019/0300185 A1 | 10/2019 | Tang et al. | |
| 2019/0377021 A1 | 12/2019 | Bhalwankar et al. | |
| 2019/0389602 A1 | 12/2019 | Schilling | |
| 2020/0094991 A1 | 3/2020 | Datas et al. | |
| 2020/0101571 A1 | 4/2020 | Datas et al. | |
| 2020/0172267 A1 | 6/2020 | Darbonville et al. | |
| 2021/0061027 A1 | 3/2021 | Da Peppo et al. | |
| 2021/0064063 A1 | 3/2021 | Wakikawa | |
| 2021/0072772 A1 | 3/2021 | Miyakawa et al. | |
| 2021/0080285 A1 | 3/2021 | Connor | |
| 2021/0091848 A1 | 3/2021 | Cai | |
| 2021/0258067 A1 | 8/2021 | Hoshino et al. | |
| 2021/0319705 A1 | 10/2021 | Furumoto | |
| 2022/0348356 A1 | 11/2022 | Millspaugh | |

FOREIGN PATENT DOCUMENTS

| | | | |
|---|---|---|---|
| EP | 2949516 A1 | 12/2015 |
| JP | s63644 A | 1/1988 |
| JP | H03137732 A | 6/1991 |
| JP | H0588926 A | 4/1993 |
| JP | 2001102801 A | 4/2001 |
| JP | 2003223338 A | 8/2003 |
| JP | 2004130852 A | 4/2004 |
| JP | 2005145090 A | 6/2005 |
| JP | 2008207705 A | 9/2008 |
| JP | 2019054490 A | 4/2020 |
| WO | 2017083406 A1 | 5/2017 |
| WO | 2017130137 A1 | 8/2017 |
| WO | 2017197245 A1 | 11/2017 |
| WO | 2018234799 A1 | 12/2018 |

OTHER PUBLICATIONS

Abraham et al., "Dynamic Optimization of High-Altitude Solar Aircraft Trajectories Under Station-Keeping Constraints", Journal of Guidance and Control and Dynamics, vol. 42, No. 3, Nov. 26, 2018, pp. 538-552.
Hosseini Saghar et al.: "Optimal path planning and power allocation for a long endurance solar-powered UAV", 2015 American Control Conference (ACC), IEEE, Jun. 17, 2013 (Jun. 17, 2013), pp. 2588-2593, XP032476633, ISSN: 0743-1619, DOI: 10.1109/ACC. 2013.6580224 [retrieved on Aug. 14, 2013] *p. 2589-p. 2592*.
Lee Joo-Seok et al.: Flight path optimization of solar powered UAV for endurance flight, 2015 54th Annual Conference of the Society of Instrument and Control Engineers of Japan( (SICE), the Society of Instrument and Control Engineers-SICE, Jul. 28, 2015 (Jul. 28, 2015), pp. 820-823, XP033220597, DOI:10.1109/SICE.2015. 7285496 [retrieved on Sep. 30, 2015] *whole document*.
Sumada Tomolawn, Miyagi ** , special : jet-engine digital control system for a microcomputer aircraft for carrying moving objects, research report of informationprocessing society, Japan, Incorporated Information Processing Society, Dec. 12, 1991, vol. 91, No. 109, pp. 1-8.
International Search Report for PCT/US20/29658 mailed Feb. 2, 2021.

* cited by examiner

AWAY FROM THE SUN

TOWARDS THE SUN

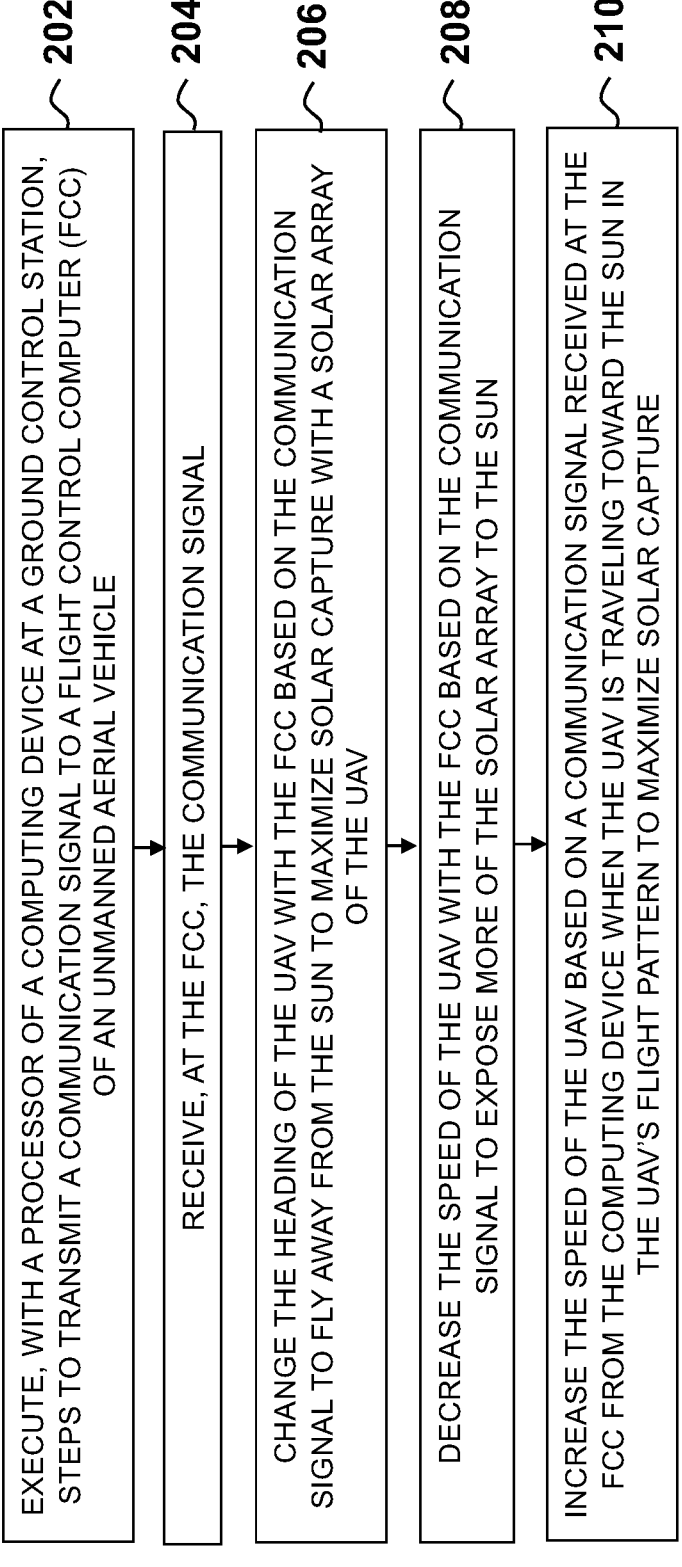

200

202 EXECUTE, WITH A PROCESSOR OF A COMPUTING DEVICE AT A GROUND CONTROL STATION, STEPS TO TRANSMIT A COMMUNICATION SIGNAL TO A FLIGHT CONTROL COMPUTER (FCC) OF AN UNMANNED AERIAL VEHICLE

204 RECEIVE, AT THE FCC, THE COMMUNICATION SIGNAL

206 CHANGE THE HEADING OF THE UAV WITH THE FCC BASED ON THE COMMUNICATION SIGNAL TO FLY AWAY FROM THE SUN TO MAXIMIZE SOLAR CAPTURE WITH A SOLAR ARRAY OF THE UAV

208 DECREASE THE SPEED OF THE UAV WITH THE FCC BASED ON THE COMMUNICATION SIGNAL TO EXPOSE MORE OF THE SOLAR ARRAY TO THE SUN

210 INCREASE THE SPEED OF THE UAV BASED ON A COMMUNICATION SIGNAL RECEIVED AT THE FCC FROM THE COMPUTING DEVICE WHEN THE UAV IS TRAVELING TOWARD THE SUN IN THE UAV'S FLIGHT PATTERN TO MAXIMIZE SOLAR CAPTURE

FIG. 5

METHOD OF OPERATING A HIGH ALTITUDE LONG ENDURANCE AIRCRAFT FOR MAXIMIZING SOLAR CAPTURE

CROSS-REFERENCE TO RELATED APPLICATION

This application is a 35 U.S.C § 371 National Stage Entry of International Application No. PCT/US2020/029652, filed Apr. 23, 2020, which claims priority to and the benefit of U.S. Provisional Patent Application No. 62/838,783, filed Apr. 25, 2019, U.S. Provisional Patent Application No. 62/838,833, filed Apr. 25, 2019, and U.S. Provisional Patent Application No. 62/854,874, filed May 30, 2019, the contents of all of which are hereby incorporated by reference herein for all purposes.

FIELD OF ENDEAVOR

The invention relates generally to operating an Unmanned Aerial Vehicle (UAV), and more particularly to operating a solar-powered UAV.

BACKGROUND

Unmanned aerial vehicles (UAVs), such as a High Altitude Long Endurance aircraft, are lightweight aerial vehicles that are capable of controlled, sustained flight. UAVs may rely on solar power and at least one power source to power the aircraft. During flight, a UAV may automatically switch between the power source and the solar power. If the Sun is present, a solar array onboard the UAV may capture solar energy and propel the UAV by applying the solar power to a motor. Furthermore, the solar energy may be used to charge the power source.

SUMMARY

A system embodiment may include: at least one flight control computer (FCC) associated with at least one UAV, where the at least one FCC may be configured to: determine a direction of travel of the at least one UAV relative to the Sun; adjust a UAV airspeed to a first airspeed if the determined direction of travel may be towards the Sun; and adjust the UAV airspeed to a second airspeed if the determined direction of travel may be away the Sun; where the first airspeed may be greater than the second airspeed to maximize solar capture of a solar array covering at least a portion of the UAV.

In additional system embodiments, the at least one FCC may be further configured to: adjust a UAV angle to a first angle relative to a horizontal plane if the determined direction of travel may be towards the Sun; and adjust the UAV angle to a second angle relative to the horizontal plane if the determined direction of travel may be away the Sun; where the UAV angle may be relative to a plane of the UAV parallel to an upper surface of the UAV, and where the first angle may be less than the second angle to further maximize solar capture of the solar array covering at least a portion of the UAV.

In additional system embodiments, the first angle may be substantially parallel to the horizontal plane. In additional system embodiments, the second angle causes the UAV to tilts up such that the solar array is closer to perpendicular to the Sun's rays. In additional system embodiments, the solar array may be disposed on an upper surface of a wing panel of the UAV.

Additional system embodiments may further include: at least one computing device associated with a ground control station, where the at least one computing device may be in communication with the at least one FCC. In additional system embodiments, the at least one computing device may be configured to: transmit a communication signal to the at least one FCC. In additional system embodiments, the transmitted communication signal includes a command for the at least one FCC to adjust the UAV airspeed based on the direction of travel of the at least one UAV relative to the Sun. In additional system embodiments, the transmitted communication signal includes a command for the at least one FCC to adjust the UAV angle based on the direction of travel of the at least one UAV relative to the Sun. In additional system embodiments, the at least one FCC may be further configured to sustain flight of the UAV throughout the night via energy stored in one or more batteries when there may be no solar capture of the solar array.

A method embodiment may include: determining, by at least one flight control computer (FCC) associated with at least one UAV, a direction of travel of the at least one UAV relative to the Sun; adjusting, by the at least one FCC, a UAV airspeed to a first airspeed if the determined direction of travel may be towards the Sun; and adjusting, by the at least one FCC, the UAV airspeed to a second airspeed if the determined direction of travel may be away the Sun; where the first airspeed may be greater than the second airspeed to maximize solar capture of a solar array covering at least a portion of the UAV.

Additional method embodiments may further include: adjusting, by the at least one FCC, a UAV angle to a first angle relative to a horizontal plane if the determined direction of travel may be towards the Sun; and adjusting, by the at least one FCC, the UAV angle to a second angle relative to the horizontal plane if the determined direction of travel may be away the Sun; where the UAV angle may be relative to a plane of the UAV parallel to an upper surface of the UAV, and where the first angle may be less than the second angle to further maximize solar capture of the solar array covering at least a portion of the UAV.

In additional method embodiments, the first angle may be substantially parallel to the horizontal plane. In additional method embodiments, the second angle causes the UAV to tilts up such that the solar array is closer to perpendicular to the Sun's rays. In additional method embodiments, the solar array may be disposed on an upper surface of a wing panel of the UAV.

In additional method embodiments, at least one computing device associated with a ground control station may be in communication with the at least one FCC. Additional method embodiments may further include: transmitting, by the at least one computing device, a communication signal to the at least one FCC. In additional method embodiments, the transmitted communication signal includes a command for the at least one FCC to adjust the UAV airspeed based on the direction of travel of the at least one UAV relative to the Sun. In additional method embodiments, the transmitted communication signal includes a command for the at least one FCC to adjust the UAV angle based on the direction of travel of the at least one UAV relative to the Sun. Additional method embodiments may further include: sustaining, by the at least one FCC, a flight of the UAV throughout the night via energy stored in one or more batteries when there may be no solar capture of the solar array.

BRIEF DESCRIPTION OF THE DRAWINGS

The components in the figures are not necessarily to scale, emphasis instead being placed upon illustrating the principals of the invention. Like reference numerals designate corresponding parts throughout the different views. Embodiments are illustrated by way of example and not limitation in the figures of the accompanying drawings, in which:

FIG. 5 depicts a flow diagram of a method for maximizing solar capture with a solar array of an unmanned aerial vehicle, according to one embodiment;

DETAILED DESCRIPTION

Figure 1:
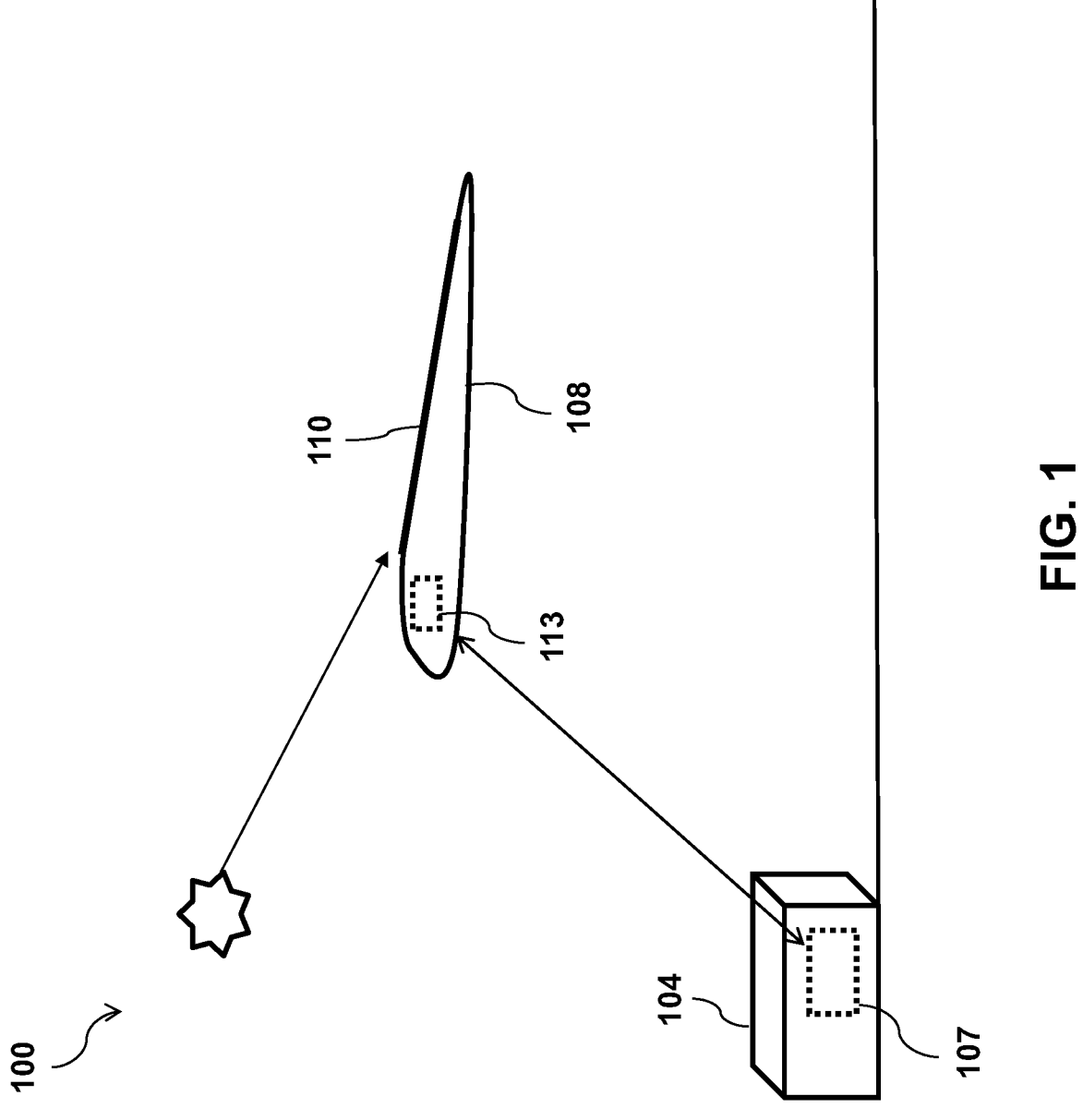
FIG. 1 depicts a system for maximizing solar capture with a solar array of an unmanned aerial vehicle (UAV), according to one embodiment.

The following description is made for the purpose of illustrating the general principles of the embodiments discloses herein and is not meant to limit the concepts disclosed herein. Further, particular features described herein can be used in combination with other described features in each of the various possible combinations and permutations. Unless otherwise specifically defined herein, all terms are to be given their broadest possible interpretation including meanings implied from the description as well as meanings understood by those skilled in the art and/or as defined in dictionaries, treatises, etc.

Near the end of the day the battery of an unmanned aerial vehicle (UAV) will become nearly fully charged since the aircraft has been exposed to solar radiation throughout the duration of the day when the Sun is above the horizon. At this point, excess energy may become available, and more batteries may be disposed on the aircraft to harness the excess energy and continue powering the aircraft to sustain flight throughout the night. However, the additional batteries are costly. Furthermore, UAV are light and batteries can account for a substantial fraction of the total weight of the UAV. Therefore, including additional batteries may result in undesired weight onboard the UAV which may hinder the performance of the UAV.

A system embodiment provides for maximizing solar capture of a solar-powered unmanned aerial vehicle (UAV) to assist in propulsion of the aircraft when solar energy is limited or no longer available to the aircraft, such as when the Sun is low on the horizon. In one embodiment, the UAV is a High Altitude Long Endurance solar-powered aircraft. The UAV may have an onboard solar array that captures solar energy. The solar energy may be used to power a motor (or motors) to propel the aircraft. The solar energy may be further used to charge at least one battery. When solar capture is limited or no longer possible, such as at night, in cloudy conditions, or when the Sun is low on the horizon the battery may be used to power the motor for propulsion of the UAV.

In one embodiment, the flight speed of the UAV is adjusted as the UAV travels to and from the Sun to maximize solar capture. The UAV may fly in a large area flight pattern, such as a "D-loop" flight pattern.

When the Sun is lower on the horizon, such as later in the day or during the winter, the UAV may mainly capture solar energy as the UAV flies away the Sun. This is because the solar array, placed on the upper surface of the wing, may be angled to the rear of the UAV due to the leading-edge-up attitude of the wing needed to create lift. Therefore, when the Sun is lower on the horizon, the solar array may capture substantial solar energy to both propel the UAV and to charge the battery as the UAV flies away from the Sun in part of the UAV's flight pattern. Slowing down when flying away from the Sun exposes more of the solar array to the Sun, particularly when the Sun is low on the horizon. This is because the nose of the UAV tilts up as the UAV slows down, causing the solar array to be more generally perpendicular to the Sun's rays as the UAV travels away from the Sun.

As the UAV travels toward the Sun, solar capture is limited or may no longer be possible; therefore, power supplied to the motors may be shifted from solar power to battery power. Thus, to sustain flight throughout the night, it is desired to maximize the time spent capturing solar energy. The UAV may slow down on the portion of the flight pattern of the UAV where the UAV travels away from the Sun as to increase the time spent capturing solar energy. This slowing down may also allow angling the wing to a steeper angle, increasing the solar energy capture. On that part of the flight pattern where the UAV is flying toward the Sun, solar energy capture decreases. Therefore, the UAV flight speed may be increased to reduce the time spent with low solar energy capture. Furthermore, flying faster may allow angling the UAV wing to a shallower angle, thereby increasing the UAV's exposure to the Sun, since the aircraft is flying toward the Sun.

With respect to FIG. 1, a system 100 for maximizing solar capture with a solar array 110 of an unmanned aerial vehicle (UAV) 108 is depicted. UAVs are aircraft with no onboard pilot and may fly autonomously or remotely. In one embodiment, the UAV 108 is a High Altitude Long Endurance aircraft. The UAV 108 may have between one and forty motors, and a wingspan between 100 feet and 400 feet. In one embodiment, the UAV 108 has a wingspan of approximately 260 feet and is propelled by ten electric motors powered by the solar array 110 covering at least a portion of the surface of the wing, resulting in zero emissions. Flying at an altitude of approximately 65,000 feet above sea level and above the clouds, the UAV is designed for continuous, extended missions of up to months without landing.

The UAV 108 functions optimally at high altitude due at least in part to the lightweight payload of the UAV. The UAV is capable of considerable periods of sustained flight without recourse to land. In one embodiment, the UAV 108 may weigh approximately 3,000 lbs and may include wing panel sections and a center panel, providing for efficient assembly and disassembly of the UAV 108 due to the attachability and detachability of the wing panel sections to each other and/or to the center panel.

Figure 2:
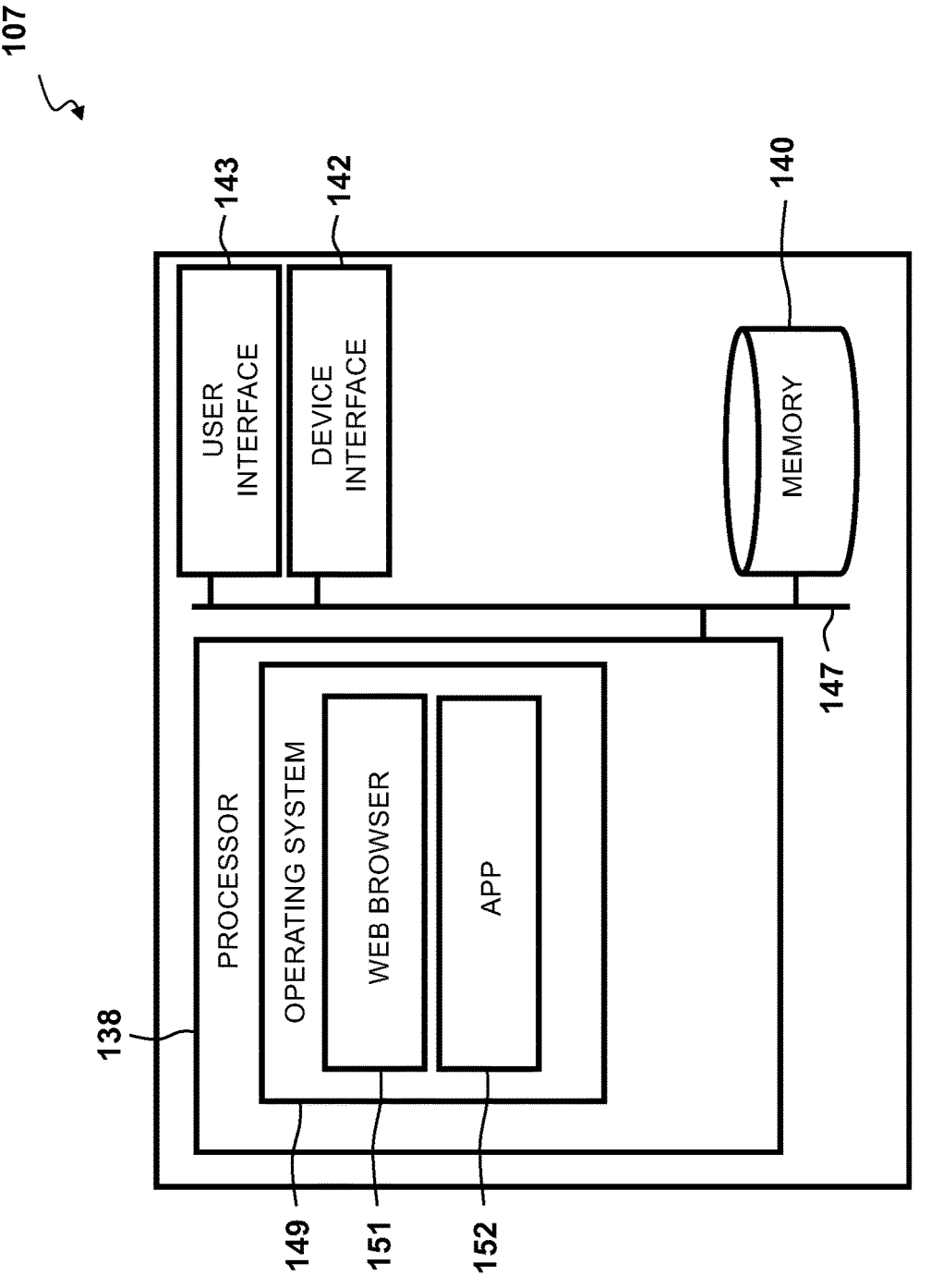
FIG. 2 depicts a top-level functional block diagram of a computing device associated with a ground control station, according to one embodiment.

In one embodiment, the system 100 may be an automated process for maximizing solar capture, wherein a computing device 107 at a ground control station 104 may be in communication with a flight control computer (FCC) 113 of the UAV 108. More specifically, and with respect to FIG. 2, an example of a top-level functional block diagram of the computing device 107 is illustrated. The computing device 107 comprises a processor 138, such as a central processing unit (CPU), addressable memory 140, an external device interface 142, e.g., an optional universal serial bus port and related processing, and/or an Ethernet port and related processing, and an optional user interface 143, e.g., an array of status lights and one or more toggle switches, and/or a display, and/or a keyboard and/or a pointer-mouse system and/or a touch screen. Optionally, the addressable memory may, for example, be: flash memory, eprom, and/or a disk drive or other hard drive. These elements may be in communication with one another via a data bus 147. In some embodiments, via an operating system 149 such as one supporting a web browser 151 and applications 152, the processor 138 may be configured to execute steps of a process establishing a communication channel. For example, the processor 138 may be in communication with the FCC 113 onboard the UAV 108 to change the UAV's 108 heading to maximize solar capture. In another embodiment, the FCC 113 may be directly programmed to automatically change the heading of the UAV 108 to maximize solar capture. In one embodiment, the UAV 108 may fly west in morning because the Sun is rising in the east. In one embodiment, the UAV 108 may fly east in the afternoon because the Sun is setting in the west. In one embodiment, the FCC may override the fly from Sun pattern and station keep if it is desired for the UAV to station keep. In station keeping, the UAV 108 maintains a flight pattern relative to the ground control station 104.

Figure 3:
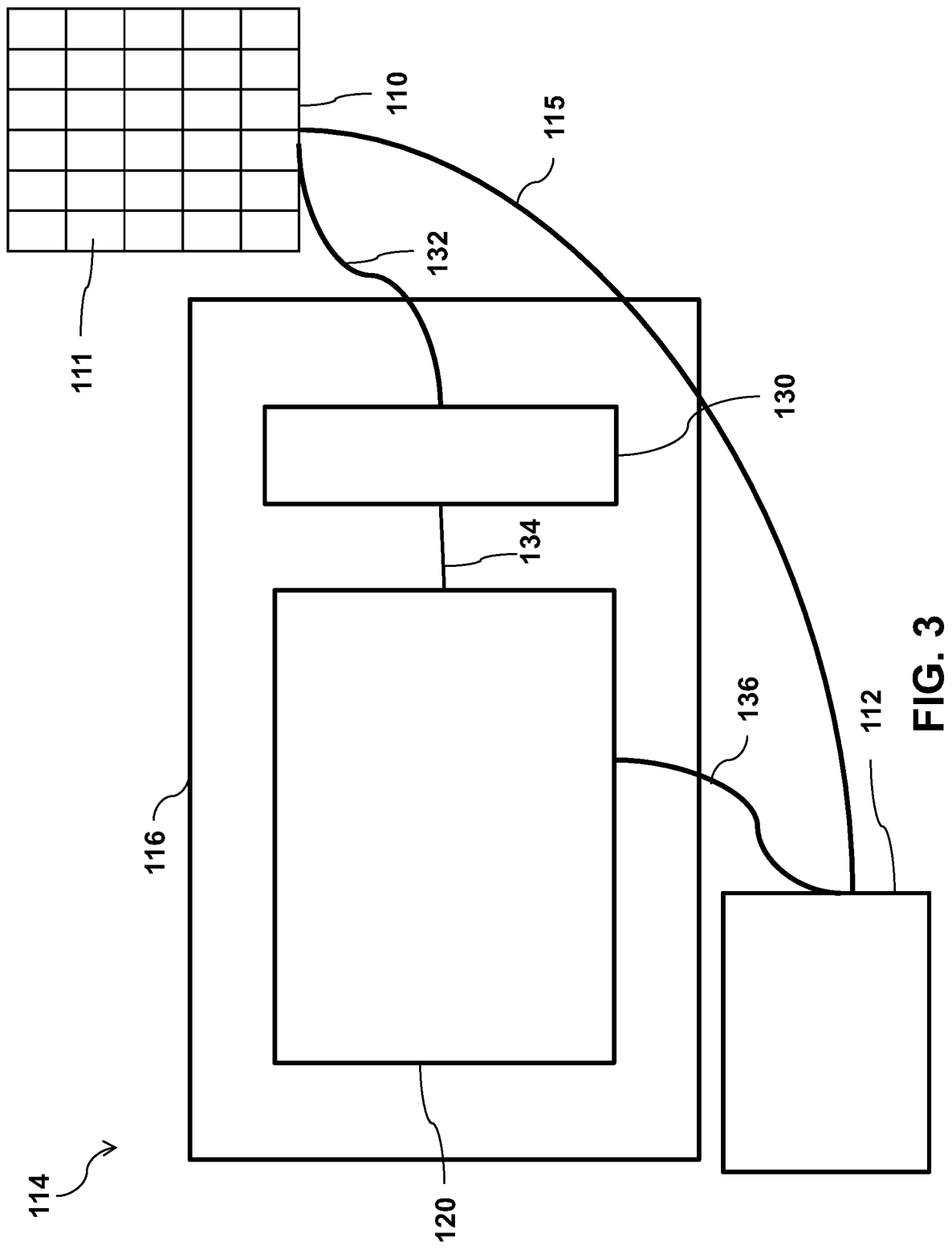
FIG. 3 depicts a system for powering the UAV of FIG. 1, according to one embodiment.
Figures 4A, 4B:
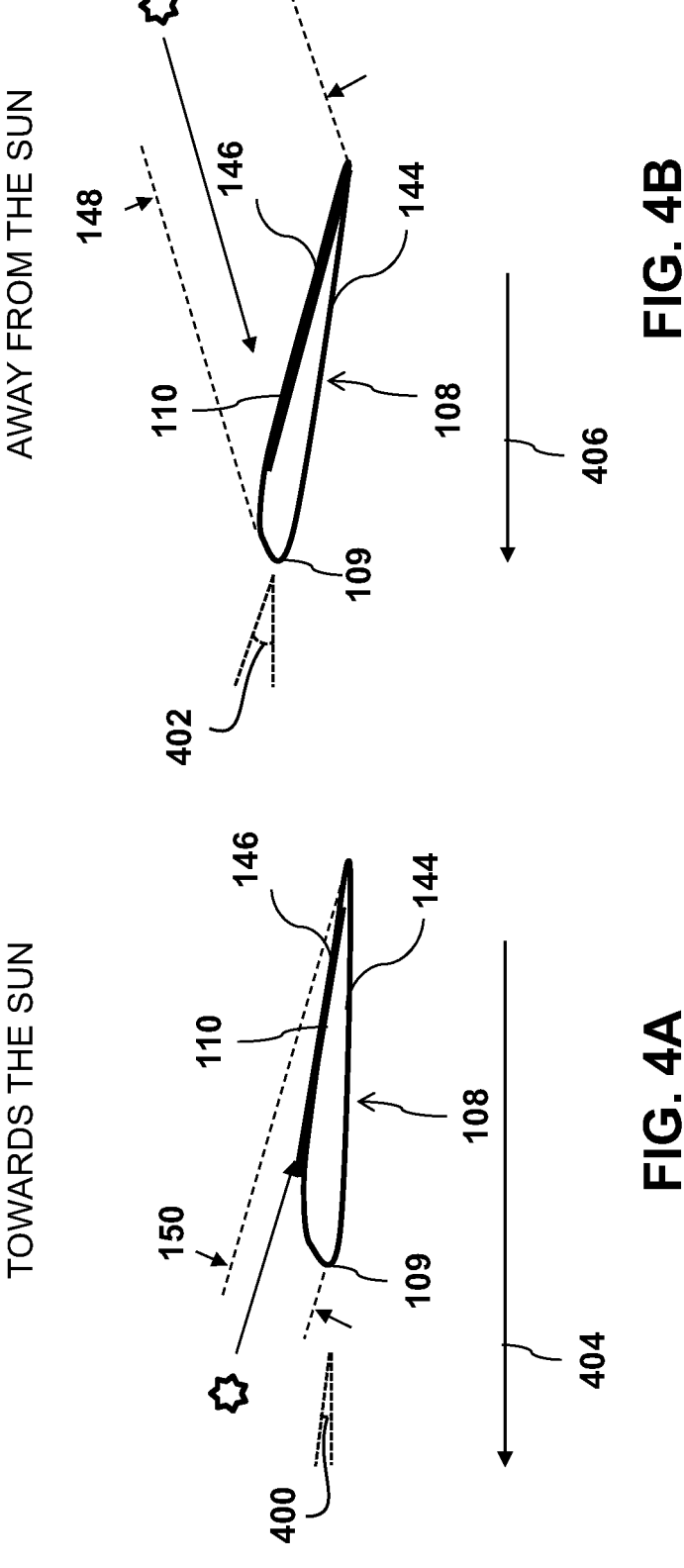
FIG. 4A depicts a process for maximizing solar capture with the solar array of the UAV of FIG. 1 as the unmanned aerial vehicle travels toward the Sun, according to one embodiment.
FIG. 4B depicts a process for maximizing solar capture with the solar array of the UAV of FIG. 1 as the unmanned aerial vehicle travels away from the Sun, according to one embodiment.

With respect to FIG. 3, the UAV 108, as shown in FIG. 1, further includes at least one motor 112 for propulsion of the UAV 108. In one embodiment, the UAV 108 has ten electric motors. The solar array 110 may be configured to capture solar energy from the Sun when the Sun is above the horizon. The solar energy, in turn, is used to power all or part of the UAV's 108 propulsion. In one embodiment, the UAV 108 includes at least one wing panel 144 and the solar array 110 is adhered to at least a portion of an upper surface 146 of the wing panel 144, as shown in FIGS. 4A-4B. As the UAV 108 travels away from the Sun when the Sun is low on the horizon, the solar array 110 faces the Sun to efficiently capture the solar radiation. This is because the more area of the solar array that is exposed to the Sun, the more solar radiation will be captured by the solar array. In one embodiment, as the Sun sets below the horizon, the solar array 110 no longer captures solar radiation; however, the energy captured by the solar array 110 mainly as the UAV 108 headed away from the Sun may be converted to electrical energy to charge or provide power to a battery. The battery, in turn, will provide power to the motor 112 to propel the UAV 108. More specifically, the solar array 110 may contain a plurality of solar array cells 111. The cells 111 may be photovoltaic (PV) cells. In one embodiment, the cells 111 convert the captured solar energy into direct current (DC) electrical energy. In one embodiment, the solar array 110 may produce approximately one-hundred and fifty volts. The conversion of solar energy to electricity may be achieved using semiconducting materials in the PV cells which exhibit the photovoltaic effect, where light (i.e., photons) are converted to electricity (i.e., voltage).

A battery back system 114 may include a battery 120 for powering the UAV 108. In one embodiment, battery 120 is a lithium ion (Li-ion) battery. It is desired to maximize the life span of the battery 120, such as the "cycle life" and the "calendar life". Cycle life refers to the aging of the battery 120 based on the overall operating, or usage, time of the battery 120. More specifically, the cycle life is the number of full discharge-charge cycles of the battery 120. The calendar life is the aging of the battery 120 which is just as a function of time. The cycle life may be decreased by a number of factors, including; (1) strain caused by operating a too high or low of a voltage state, (2) high charge rates, (3) charging at very cool temperatures, and (4) high discharge rates. The calendar life of the Li-ion battery 120 may lose capacity with time, and the capacity loss may be exacerbated by generally operating at very high and low temperatures, and spending too much time at high states of charge during storage. Detection of a cut-off point and terminating the charge so not too much time is spent at high states of charge is critical in preserving battery life. There may be a predetermined upper voltage limit, or "termination voltage", beyond which the charge may be terminated. This is particularly important with fast chargers where the danger of overcharging is greater. In one embodiment, the battery 120 may have a long life cycle, enabling the support of extended missions and can be operated in extreme environmental conditions, such as high winds and low temperatures.

The battery pack 114 may further include at least one power tracker 130 proximate the battery 120. In another embodiment, the power tracker 130 may be located outside of the battery pack 114. The power point tracker 120 may be configured to ensure that a maximum amount of power is obtained from the solar array 110. In one embodiment, the power tracker 130 is in communication with the solar array 110, and the power tracker 130 is configured to receive electrical energy produced by the solar array 110. More specifically, the cells 111 of the solar array 110 convert Sunlight into electrical energy and the power tracker 130 receives the electricity from the solar array 110 from an output 132, such as a bus, of the solar array 110. The solar array 110 operates at a lower voltage than the output 132. In one embodiment, the power tracker 130 is a maximum power point tracker (MPPT) controller configured to boost voltage from the solar array 110 to the output 132 and to adjust a boost ratio to get the maximum power from the solar array 110.

The power tracker 130 has an output 134 configured for supplying electrical charge to the battery 120. In one embodiment, the power tracker 130 is configured to maximize the power from the solar array 110, and to regulate the voltage transmitted to the battery 120. For example, the amount of solar radiation captured, and hence, produced by the solar array 110 may vary throughout the day as the Sun's position changes in the sky. The power tracker 130 may be used to provide a steady voltage to the battery 120. The battery 120 may sustain approximately 270-380 Volts (as opposed to roughly 150 Volts coming solely from the solar array).

When the battery 120 becomes close to being fully charged the battery 120 may no longer be able to charge rapidly, requiring a slow taper off of the charge. If the battery 120 is fully charged, the battery 120 may discharge when the battery 120 is left unused and may lose effectiveness (e.g., the ability to charge rapidly). Additionally, over-charging of the battery 120 may cause the generation of heat and gasses, both of which are harmful for the battery 120, or cause the battery 120 to overheat and even burn.

Once the battery 120 is fully charged, the charging current may need to be reduced as the it is desired to taper off the charging process before any damage to the battery 120 occurs, while at all times maintaining the battery 120 temperature within its pre-determined limits. In one embodiment, the battery 120 temperature is maintained within its pre-determined limits by adjusting the power tracker 130 voltage boost ratio to operate the solar array 110 conditions that may reduce the energy output of the solar array 110. In another embodiment, the battery 120 temperature is maintained within its preferred limits by absorbing the extra current with the UAV 108 propulsion system. In another embodiment, the battery 120 temperature is maintained within its preferred limits the battery 120 temperature is maintained within its pre-determined limits in combination with the aircraft propulsion system.

The solar array 110 may be used to propel the UAV 108, power onboard electronics, and charge the battery 120 with surplus energy, as described above. More specifically, the cells 111 of the solar array 110 convert Sunlight into electrical energy to provide power to the motor 112. In one embodiment, the solar array 110 has an output 115 configured for supplying electrical energy to the motor 112. In one embodiment, the electrical energy is a DC current.

With reference to FIGS. 4A-4B, the UAV 108 may fly in large area flight patterns, such as a "D-loop" flight pattern. Other flight patterns are possible and contemplated, such as circular, oblong, or box-shaped flight patterns. When the Sun is lower on the horizon, such as later in the day or during the winter time the UAV 108 mainly captures solar energy as the UAV 108 flies away from the Sun, as shown in FIG. 4B. In one embodiment, the solar array 110 may be placed on a portion of the upper surface 146 of a wing 144 of the UAV 108. The solar array 110 may be angled to the rear of the UAV 108 due to the leading-edge-up attitude of the wing 144 needed to create lift. Therefore, when the Sun is lower on the horizon, the solar array 110 may capture substantial solar energy to both propel the UAV 108 and to charge the battery 120 as the UAV 108 flies away from the Sun in part of the UAV's flight pattern.

Furthermore, slowing down when heading away from the Sun exposes more of the solar array 110 to the Sun, particularly when the Sun is low on the horizon, as shown in FIG. 4B. This is because a nose 109 of the UAV 108 tilts up as the UAV 108 slows down, causing the solar array 110 to be more generally perpendicular to the Sun's rays as the UAV 108 travels away from the Sun. The tilting up of the nose 109 of the UAV 108 as the UAV 108 slows down leads to a large solar aperture 148, thereby maximizing solar capture.

When the UAV 108 turns and maneuvers to stay close to the station, e.g., the ground control station 104, solar capture may be limited as the UAV 108 travels toward the Sun in the UAV's 108 flight pattern. Furthermore, when the UAV 108 is not needed to stay close to the ground control station 104, solar capture is limited as the UAV 108 turns and travels toward the Sun in the UAV's 108 flight pattern. Therefore, the UAV 108 flight speed may be increased to reduce the time spent with low solar energy capture. More specifically, flying faster may allow tilting of the UAV wing 144 to a shallower angle as the nose 109 tilts down. Traveling at a slower speed would cause the UAV 108 nose 109 to tilt up, decreasing the exposure of the solar array 110 to the Sun. Thus, speeding up of the UAV 108 as the UAV 108 travels toward the Sun may result in increasing the UAV's 108 solar aperture to the Sun. This may provide for a large solar aperture 150 than if the UAV 108 did not speed up, thereby maximizing solar capture.

In one embodiment, increasing the speed of the UAV 108 may be more efficient for solar capture because traveling slowly may mean that more time is spent not capturing solar energy. In one embodiment, the speed range for the UAV 108 as the UAV 108 travels toward the Sun may be 24 knots indicated airspeed, dropping to 19 knots as the UAV 108 travels away from the Sun. The UAV 108 may travel at a first airspeed 404 when traveling towards the Sun, such as 24 knots. The UAV 108 may travel at a second airspeed 406 when traveling away from the sun, such as 19 knots. The first airspeed 404 traveling toward the sun may be greater than a second airspeed 406 traveling away from the Sun. In one embodiment, if the heading of the UAV 108 is perpendicular to the Sun, such that the wing tip of the UAV 108 is pointing approximately toward the Sun. In some embodiments, the first airspeed 404 may be approximately 19-20 knots. In one embodiment, at any point, or heading, on the UAV's 108 flight pattern, a speed of the UAV 108 may be determined to capture the maximum amount of solar radiation and maximize UAV 108 performance. A plane of the UAV 108 parallel to the wing panel 144 or an upper surface 146 of the wing panel 144 may be angled relative to a horizontal or ground plane by a first angle 400 when flying towards the sun, as shown in FIG. 4A. The first angle 400 may be 0 degrees in some embodiments. In other embodiments, the first angle 400 may be minimal so as to maximize solar capture by the solar array 110 when flying towards the Sun, as shown in FIG. 4A. The plane of the UAV 108 parallel to the wing panel 144 or the upper surface 146 of the wing panel 144 may be angled relative to the horizontal or the ground plane by a second angle 402 when flying away from the Sun, as shown in FIG. 4B. The second angle 402 may be greater than the first angle 400. In other embodiments, the second angle 402 may be maximized so as to maximize solar capture by the solar array 110 when flying away the sun, as shown in FIG. 4B. The second angle 402 may produce a slower rate of speed for the UAV, i.e., the second airspeed 406, as compared to the first angle 400, i.e., the first airspeed 404. In some embodiments, the airspeeds 404, 406 of the UAV may be based on the angling 400, 402 of the plane of the UAV 108. For example, as the plane of the UAV 108 approaches parallel with horizontal the speed of the UAV increases, and as the plane of the UAV 108 approaches perpendicular with horizontal or vertical the speed of the UAV decreases. In one embodiment, adjusting the angle of the top surface relative to the horizontal plane is pitching the UAV up or down, which will change the speed of the UAV for level flight. In one embodiment, the speed may be programmed into the FCC 113. Based on the location of the Sun with respect to the UAV 108 and the direction of travel of the UAV 108, the FCC 113 may set a speed to capture the maximum amount of solar radiation and maximize UAV performance 108.

In some embodiments, the angles 400, 402 and/or speed 404, 406 of the UAV 108 may be variable based on the time of day. For example, the angle may be less and/or the speed may be faster closer to noon when the Sun is directly overhead as compared to the beginning or end of the day where a greater angle and/or slower speed may be needed. In one embodiment, an adjustment to the angles 400, 402 and/or speed 404, 406 of the UAV 108 may be made early in the day and/or late in the day when the sun angle is low In one embodiment, angles 400, 402 and/or speed 404, 406 of the UAV 108 at noon may be such that the UAV is flown at the most optimal speed for minimum power required.

In one embodiment, the flight pattern for maximizing solar capture may be repeated until the Sun is completely below the horizon. After the Sun has set, the battery 120 may power the motor 112 throughout the night when no solar radiation is available. In one embodiment, the UAV 108 may transition to a different flight pattern at night or remain in the same D-loop pattern. The positioning of the loiter or D-loop pattern may be primarily dictated by wind speed and/or wind direction in one embodiment. In some embodiments, the loiter or D-pattern may be modified so as to better account for the angle of the Sun relative to the solar array of the UAV 108. As the Sun begins to rise, the UAV 108 may execute the D-loop flight pattern for maximizing solar capture; increasing speed as the UAV 108 travels towards the Sun, and decreasing speed as the UAV 108 flies away from the Sun. When the Sun is sufficiently high above the horizon, the UAV 108 may travel at an approximately constant speed, since the solar array 110 may be continuously exposed to solar radiation from the Sun.

With respect to FIG. 5, a flowchart of a method 200 for maximizing solar capture with a solar array of an unmanned aerial vehicle (UAV) is shown. When the Sun is lower on the horizon, such as later in the day or during the winter the UAV mainly captures solar energy as the UAV flies away from the Sun.

In one embodiment, the solar array may be placed on at least a portion of an upper surface of a wing of the UAV. The solar array may be angled to the rear of the UAV due to the leading-edge-up attitude of the wing needed to create lift. Therefore, when the Sun is lower on the horizon, the solar array may capture substantial solar energy to both propel the UAV and to charge a battery of the UAV as the UAV flies away from the Sun in part of the UAV's flight pattern. In one embodiment, a computing device at a ground control station may be in communication with a flight control computer (FCC) of the UAV. A processor of the computing device at the ground control station may execute steps to transmit a communication signal to the FCC onboard the UAV, such as when the Sun is lower on the horizon (step 202). In some embodiments, the FCC may take steps to adjust a speed and angle of the UAV to maximize solar capture autonomously, semi-autonomously, and/or in response to an input from a processor at a ground control station. In some embodiments, the FCC may adjust an angle and/or speed of the UAV based on the UAV heading autonomously. The FCC may receive the communication signal (step 204). The FCC may change the UAV's heading based on the communication signal to fly away from the Sun to maximize solar capture with the solar array (step 206). In another embodiment, the FCC may be directly programmed to automatically change the heading of the UAV to maximize solar capture. The FCC may decrease the UAV's speed based on the communication signal to exposes more of the solar array to the Sun, particularly when the Sun is low on the horizon (step 206). The nose of the UAV tilts up as the UAV slows down, causing the solar array to be more generally perpendicular to the Sun's rays, e.g., at a greater angle than as compared to level flight, as the UAV travels away from the Sun. The tilting up of the nose of the UAV as the UAV slows down leads to a large solar aperture, thereby maximizing solar capture. In one embodiment, increasing the speed of the UAV may be more efficient for solar capture because traveling slowly may mean that more time is spent not capturing solar energy.

When the UAV turns and maneuvers to stay close to a ground control station, solar capture may be limited as the UAV travels toward the Sun in the UAV's flight pattern. Furthermore, when the UAV is not needed to stay close to the ground control station, solar capture is limited as the UAV turns and travels toward the Sun in the UAV's flight pattern. The UAV flight speed may be increased based on a communication signal received at the FCC from the computing device to maximize solar capture (step 210). The increased speed reduces the time spent with low solar energy capture, and flying faster may allow tilting of the UAV wing to a shallower angle as the nose tilts down, exposing more of the solar array to the Sun. Speeding up of the UAV as the UAV travels toward the Sun may result in increasing the UAV's solar aperture to the Sun. This may provide for a large solar aperture than if the UAV did not speed up, thereby maximizing solar capture.

Figure 6:
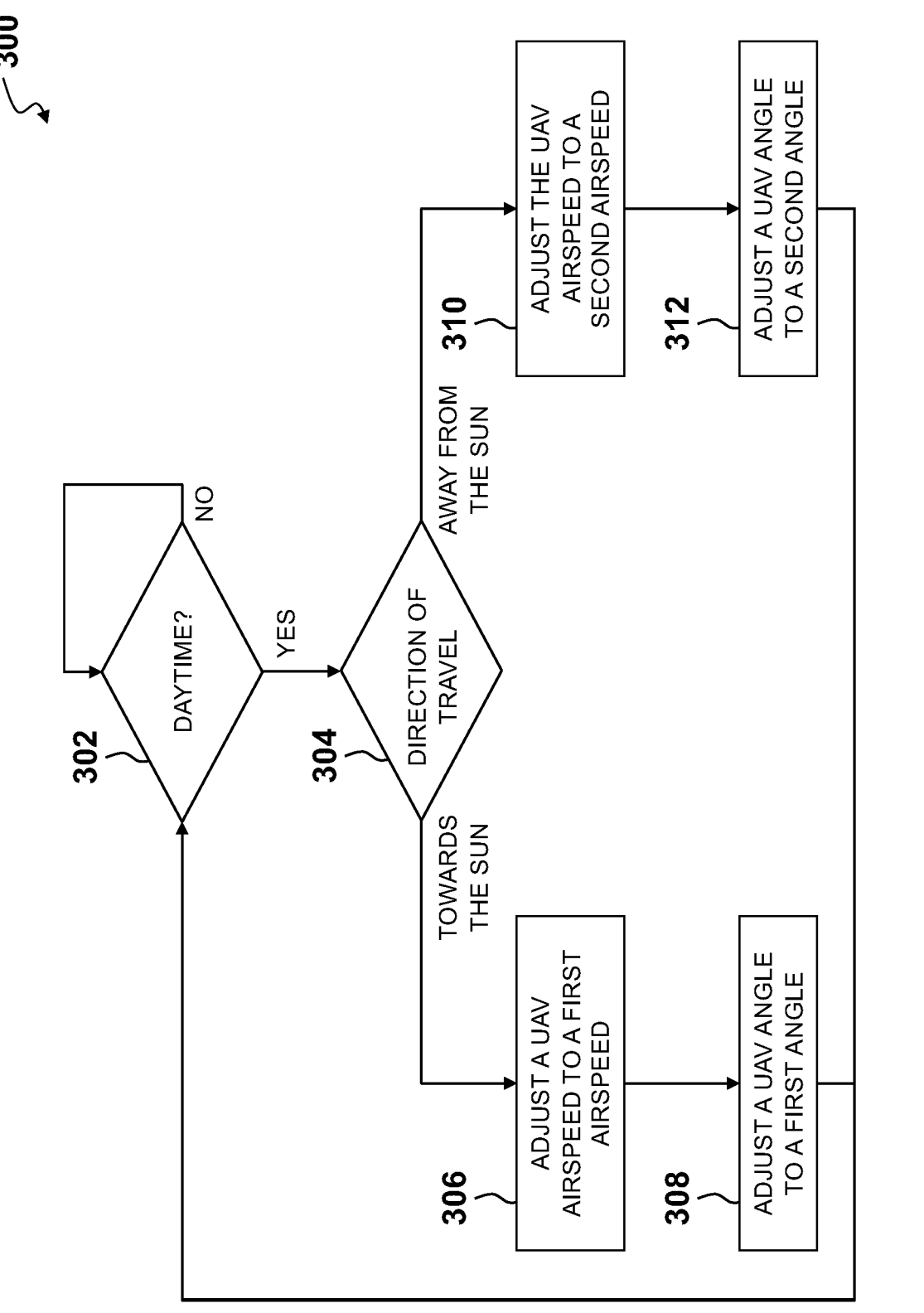
FIG. 6 depicts a high-level flowchart of a method embodiment for maximizing solar capture with a solar array of an unmanned aerial vehicle, according to one embodiment.

FIG. 6 depicts a high-level flowchart of a method 300 embodiment for maximizing solar capture with a solar array of an unmanned aerial vehicle (UAV), according to one embodiment. The method 300 may include determining if it is daytime, i.e., whether it is between sunrise and sunset when a solar array 110 of the UAV 108 can capture solar energy (step 302). Determining the time of day may be done by a computing device 107 at a ground control station 104 and/or a flight control computer (FCC) 113 of the UAV 108, as shown in FIG. 1. If it is not daytime, the UAV may continue in a flight path to conserve energy until solar energy can be captured again, such as after sunrise. The computing device 107 at the ground control station 104 and/or the FCC 113 of the UAV 108 may then determine a direction of travel of the UAV 108, as shown in FIG. 1 (step 304). The UAV may fly in a stating keeping pattern to stay within a set distance of a ground control station. In some embodiments, the UAV may fly in a large area flight pattern, such as a "D-loop" flight pattern. This flight pattern may have a portion that is towards the Sun and a portion that is away from the Sun. Away from the Sun and towards the Sun are relative to a position of the Sun in the sky. For example, the Sun rises in the east and sets in the west. In the morning, if the UAV is flying east it will be flying towards the Sun and if the UAV if flying west it will be flying away from the Sun.

If the UAV is flying toward the Sun, the computing device 107 at the ground control station 104 and/or the FCC 113 of the UAV 108, as shown in FIG. 1, may adjust a UAV airspeed to a first UAV airspeed (step 306). The computing device 107 at the ground control station 104 and/or the FCC 113 of the UAV 108, as shown in FIG. 1, may also adjust a UAV angle to a first angle (step 308).

If the UAV is flying away from the Sun, the computing device 107 at the ground control station 104 and/or the FCC 113 of the UAV 108, as shown in FIG. 1, may adjust a UAV airspeed to a second UAV airspeed (step 310). The computing device 107 at the ground control station 104 and/or the FCC 113 of the UAV 108, as shown in FIG. 1, may also adjust a UAV angle to a second angle (step 312). In some embodiments, the angle and airspeed of the UAV may be related. For example, an angle closer to horizontal may result in a faster airspeed and an angle closer to vertical may result in a slower airspeed. In some embodiments, the FCC may change the angle of the UAV and the speed may change accordingly. In some embodiments, the FCC may change the speed of the UAV and the angle may change accordingly.

The first airspeed may be greater than the second airspeed. The first angle may be less than the second angle. The first airspeed is greater than the second airspeed to minimize the amount of time that the UAV is flying towards the Sun as less solar energy is captured by the solar array of the UAV when the UAV is flying towards the Sun. By flying at a faster first airspeed, the UAV can get to a portion of the flightpath of the UAV where the UAV is flying away from the sun sooner. The first angle is closer to parallel with a ground or horizontal plane in order to increase and/or maximize solar energy captured by the solar array of the UAV when the UAV is flying towards the Sun. The second airspeed is slower than the first airspeed to maximize the amount of time that the UAV is flying away from the Sun as more solar energy is captured by the solar array of the UAV when the UAV is flying away from the Sun. The second angle is closer to perpendicular with a ground or horizontal plane in order to increase and/or maximize solar energy captured by the solar array of the UAV when the UAV is flying away from the Sun.

Figure 7:
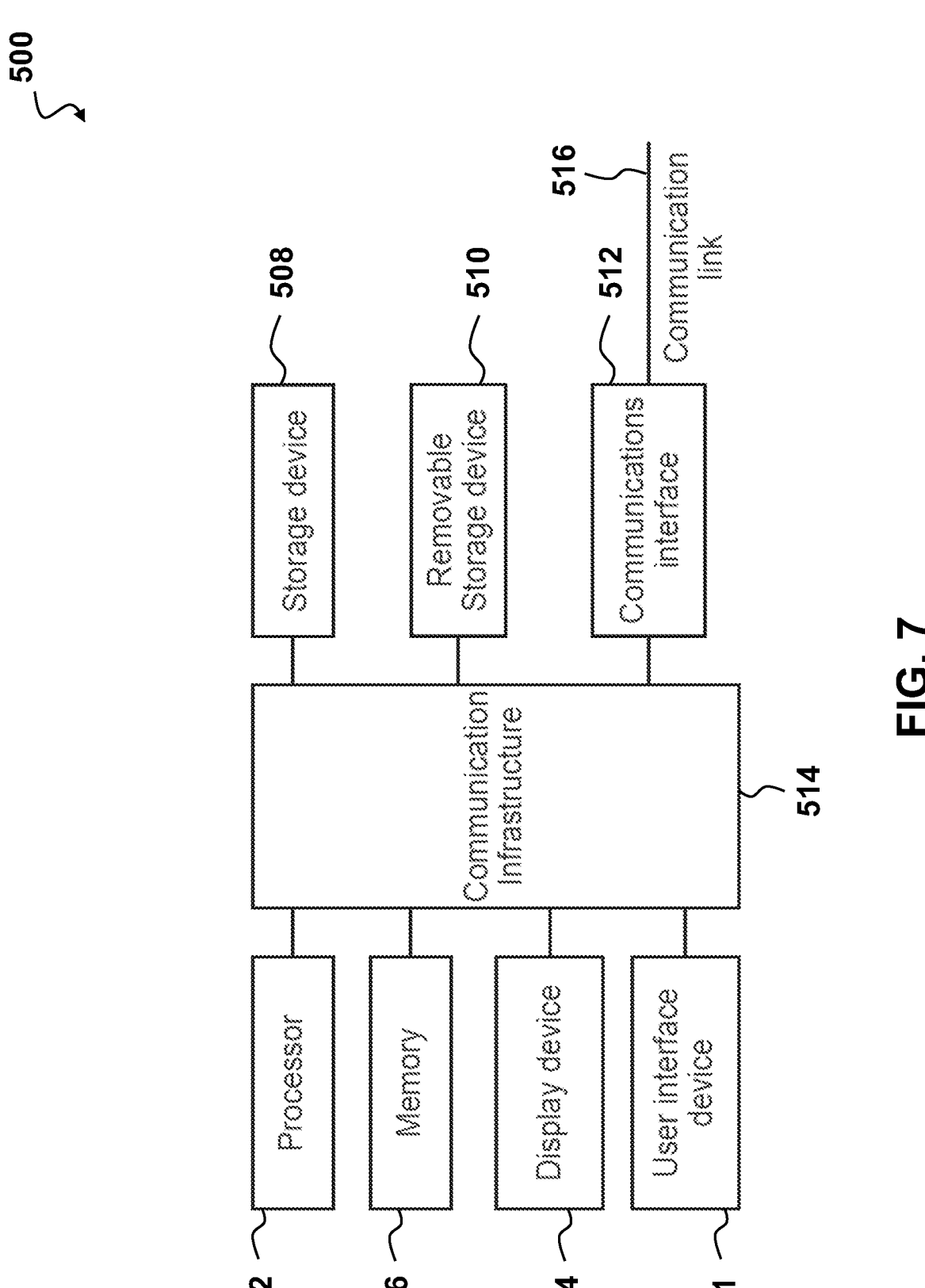
FIG. 7 shows a high-level block diagram and process of a computing system for implementing an embodiment of the system and process.

FIG. 7 is a high-level block diagram 500 showing a computing system comprising a computer system useful for implementing an embodiment of the system and process, disclosed herein. Embodiments of the system may be implemented in different computing environments. The computer system includes one or more processors 502, and can further include an electronic display device 504 (e.g., for displaying graphics, text, and other data), a main memory 506 (e.g., random access memory (RAM)), storage device 508, a removable storage device 510 (e.g., removable storage drive, a removable memory module, a magnetic tape drive, an optical disk drive, a computer readable medium having stored therein computer software and/or data), user interface device 511 (e.g., keyboard, touch screen, keypad, pointing device), and a communication interface 512 (e.g., modem, a network interface (such as an Ethernet card), a communications port, or a PCMCIA slot and card). The communication interface 512 allows software and data to be transferred between the computer system and external devices. The system further includes a communications infrastructure 514 (e.g., a communications bus, cross-over bar, or network) to which the aforementioned devices/modules are connected as shown.

Information transferred via communications interface 514 may be in the form of signals such as electronic, electromagnetic, optical, or other signals capable of being received by communications interface 514, via a communication link 516 that carries signals and may be implemented using wire or cable, fiber optics, a phone line, a cellular/mobile phone link, an radio frequency (RF) link, and/or other communication channels. Computer program instructions representing the block diagram and/or flowcharts herein may be loaded onto a computer, programmable data processing apparatus, or processing devices to cause a series of operations performed thereon to produce a computer implemented process.

Embodiments have been described with reference to flowchart illustrations and/or block diagrams of methods, apparatus (systems) and computer program products according to embodiments. Each block of such illustrations/diagrams, or combinations thereof, can be implemented by computer program instructions. The computer program instructions when provided to a processor produce a machine, such that the instructions, which execute via the processor, create means for implementing the functions/operations specified in the flowchart and/or block diagram. Each block in the flowchart/block diagrams may represent a hardware and/or software module or logic, implementing embodiments. In alternative implementations, the functions noted in the blocks may occur out of the order noted in the figures, concurrently, etc.

Computer programs (i.e., computer control logic) are stored in main memory and/or secondary memory. Computer programs may also be received via a communications interface 512. Such computer programs, when executed, enable the computer system to perform the features of the embodiments as discussed herein. In particular, the computer programs, when executed, enable the processor and/or multi-core processor to perform the features of the computer system. Such computer programs represent controllers of the computer system.

Figure 8:
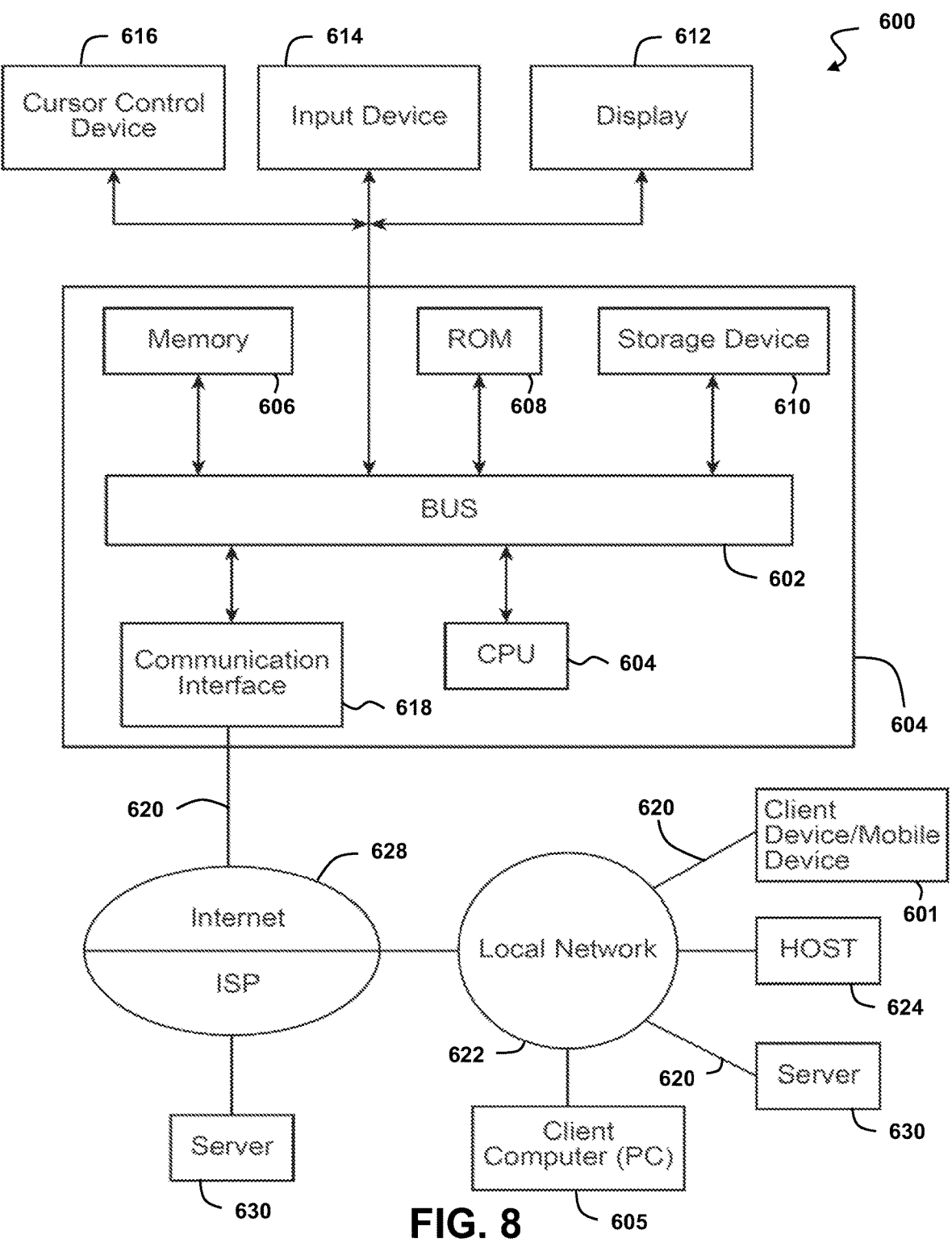
FIG. 8 shows a block diagram and process of an exemplary system in which an embodiment may be implemented.

FIG. 8 shows a block diagram of an example system 600 in which an embodiment may be implemented. The system 600 includes one or more client devices 601 such as consumer electronics devices, connected to one or more server computing systems 630. A server 630 includes a bus 602 or other communication mechanism for communicating information, and a processor (CPU) 604 coupled with the bus 602 for processing information. The server 630 also includes a main memory 606, such as a random access memory (RAM) or other dynamic storage device, coupled to the bus 602 for storing information and instructions to be executed by the processor 604. The main memory 606 also may be used for storing temporary variables or other intermediate information during execution or instructions to be executed by the processor 604. The server computer system 630 further includes a read only memory (ROM) 608 or other static storage device coupled to the bus 602 for storing static information and instructions for the processor 604. A storage device 610, such as a magnetic disk or optical disk, is provided and coupled to the bus 602 for storing information and instructions. The bus 602 may contain, for example, thirty-two address lines for addressing video memory or main memory 606. The bus 602 can also include, for example, a 32-bit data bus for transferring data between and among the components, such as the CPU 604, the main memory 606, video memory and the storage 610. Alternatively, multiplex data/address lines may be used instead of separate data and address lines.

The server 630 may be coupled via the bus 602 to a display 612 for displaying information to a computer user. An input device 614, including alphanumeric and other keys, is coupled to the bus 602 for communicating information and command selections to the processor 604. Another type or user input device comprises cursor control 616, such as a mouse, a trackball, or cursor direction keys for communicating direction information and command selections to the processor 604 and for controlling cursor movement on the display 612.

According to one embodiment, the functions are performed by the processor 604 executing one or more sequences of one or more instructions contained in the main memory 606. Such instructions may be read into the main memory 606 from another computer-readable medium, such as the storage device 610. Execution of the sequences of instructions contained in the main memory 606 causes the processor 604 to perform the process steps described herein. One or more processors in a multi-processing arrangement may also be employed to execute the sequences of instructions contained in the main memory 606. In alternative embodiments, hard-wired circuitry may be used in place of or in combination with software instructions to implement the embodiments. Thus, embodiments are not limited to any specific combination of hardware circuitry and software.

The terms "computer program medium," "computer usable medium," "computer readable medium", and "computer program product," are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Furthermore, the computer readable medium may comprise computer readable information in a transitory state medium such as a network link and/or a network interface, including a wired network or a wireless network that allow a computer to read such computer readable information. Computer programs (also called computer control logic) are stored in main memory and/or secondary memory. Computer programs may also be received via a communications interface. Such computer programs, when executed, enable the computer system to perform the features of the embodiments as discussed herein. In particular, the computer programs, when executed, enable the processor multi-core processor to perform the features of the computer system. Accordingly, such computer programs represent controllers of the computer system.

Generally, the term "computer-readable medium" as used herein refers to any medium that participated in providing instructions to the processor 604 for execution. Such a medium may take many forms, including but not limited to, non-volatile media, volatile media, and transmission media. Non-volatile media includes, for example, optical or magnetic disks, such as the storage device 610. Volatile media includes dynamic memory, such as the main memory 606. Transmission media includes coaxial cables, copper wire and fiber optics, including the wires that comprise the bus 602. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, a carrier wave as described hereinafter, or any other medium from which a computer can read.

Various forms of computer readable media may be involved in carrying one or more sequences of one or more instructions to the processor 604 for execution. For example, the instructions may initially be carried on a magnetic disk of a remote computer. The remote computer can load the instructions into its dynamic memory and send the instructions over a telephone line using a modem. A modem local to the server 630 can receive the data on the telephone line and use an infrared transmitter to convert the data to an infrared signal. An infrared detector coupled to the bus 602 can receive the data carried in the infrared signal and place the data on the bus 602. The bus 602 carries the data to the main memory 606, from which the processor 604 retrieves and executes the instructions. The instructions received from the main memory 606 may optionally be stored on the storage device 610 either before or after execution by the processor 604.

The server 630 also includes a communication interface 618 coupled to the bus 602. The communication interface 618 provides a two-way data communication coupling to a network link 620 that is connected to the world wide packet data communication network now commonly referred to as the Internet 628. The Internet 628 uses electrical, electromagnetic or optical signals that carry digital data streams. The signals through the various networks and the signals on the network link 620 and through the communication interface 618, which carry the digital data to and from the server 630, are exemplary forms or carrier waves transporting the information.

In another embodiment of the server 630, interface 618 is connected to a network 622 via a communication link 620. For example, the communication interface 618 may be an integrated services digital network (ISDN) card or a modem to provide a data communication connection to a corresponding type of telephone line, which can comprise part of the network link 620. As another example, the communication interface 618 may be a local area network (LAN) card to provide a data communication connection to a compatible LAN. Wireless links may also be implemented. In any such implementation, the communication interface 618 sends and receives electrical electromagnetic or optical signals that carry digital data streams representing various types of information.

The network link 620 typically provides data communication through one or more networks to other data devices. For example, the network link 620 may provide a connection through the local network 622 to a host computer 624 or to data equipment operated by an Internet Service Provider (ISP). The ISP in turn provides data communication services through the Internet 628. The local network 622 and the Internet 628 both use electrical, electromagnetic or optical signals that carry digital data streams. The signals through the various networks and the signals on the network link 620 and through the communication interface 618, which carry the digital data to and from the server 630, are exemplary forms or carrier waves transporting the information.

The server 630 can send/receive messages and data, including e-mail, program code, through the network, the network link 620 and the communication interface 618. Further, the communication interface 618 can comprise a USB/Tuner and the network link 620 may be an antenna or cable for connecting the server 630 to a cable provider, satellite provider or other terrestrial transmission system for receiving messages, data and program code from another source.

The example versions of the embodiments described herein may be implemented as logical operations in a distributed processing system such as the system 600 including the servers 630. The logical operations of the embodiments may be implemented as a sequence of steps executing in the server 630, and as interconnected machine modules within the system 600. The implementation is a matter of choice and can depend on performance of the system 600 implementing the embodiments. As such, the logical operations constituting said example versions of the embodiments are referred to for e.g., as operations, steps or modules.

Similar to a server 630 described above, a client device 601 can include a processor, memory, storage device, display, input device and communication interface (e.g., e-mail interface) for connecting the client device to the Internet 628, the ISP, or LAN 622, for communication with the servers 630.

The system 600 can further include computers (e.g., personal computers, computing nodes) 605 operating in the same manner as client devices 601, where a user can utilize one or more computers 605 to manage data in the server 630.

Figure 9:
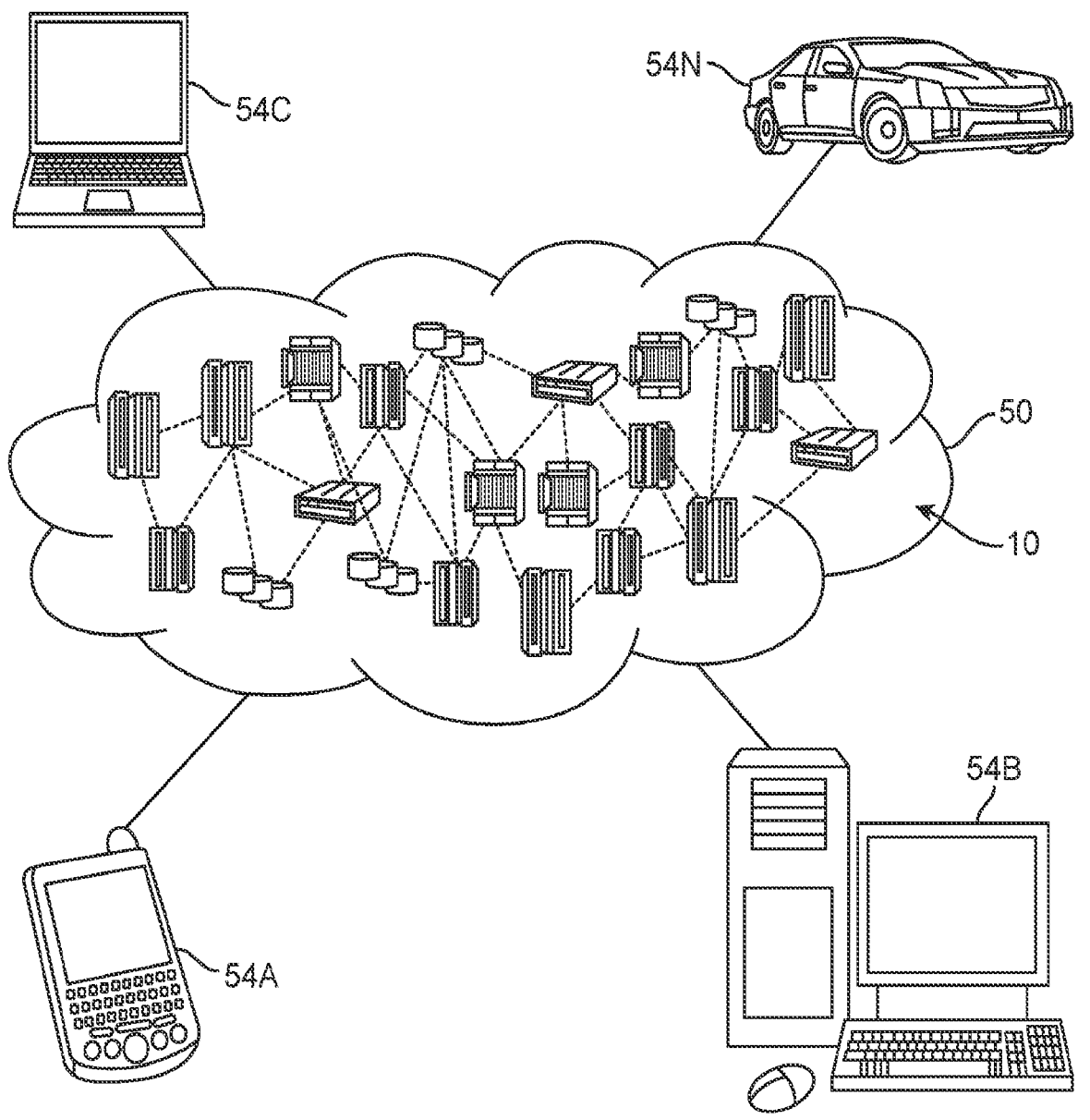
FIG. 9 depicts a cloud computing environment for implementing an embodiment of the system and process disclosed herein.

Referring now to FIG. 9, illustrative cloud computing environment 50 is depicted. As shown, cloud computing environment 50 comprises one or more cloud computing nodes 10 with which local computing devices used by cloud consumers, such as, for example, personal digital assistant (PDA), smartphone, smart watch, set-top box, video game system, tablet, mobile computing device, or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

It is contemplated that various combinations and/or subcombinations of the specific features and aspects of the above embodiments may be made and still fall within the scope of the invention. Accordingly, it should be understood that various features and aspects of the disclosed embodiments may be combined with or substituted for one another in order to form varying modes of the disclosed invention. Further, it is intended that the scope of the present invention herein disclosed by way of examples should not be limited by the particular disclosed embodiments described above.

What is claimed is:

1. A system, comprising:
at least one flight control computer (FCC) associated with at least one UAV, wherein the at least one FCC is configured to:
   determine a direction of travel of a first UAV of the at least one UAV relative to a Sun;
   adjust an airspeed of the first UAV to a first airspeed if the determined direction of travel of the first UAV is towards the Sun; and
   adjust the airspeed of the first UAV to a second airspeed if the determined direction of travel of the first UAV is away the Sun;
   wherein the first airspeed is greater than the second airspeed to maximize solar capture of a solar array covering at least a portion of the first UAV;
   adjust an angle of the first UAV to a first angle relative to a horizontal plane if the determined direction of travel of the first UAV is towards the Sun; and
   adjust the angle of the first UAV to a second angle relative to the horizontal plane if the determined direction of travel of the first UAV is away the Sun;
   wherein the angle of the first UAV is relative to a plane of the first UAV parallel to an upper surface of the first UAV, wherein the first angle is substantially parallel to the horizontal plane, wherein the second angle causes the first UAV to tilt up such that the solar array is closer to perpendicular to the Sun's rays;
   wherein the at least one FCC is further configured to control the first UAV to loiter within a set distance of a ground control station in a large-area D-loop flight pattern having portions toward the Sun and portions away from the Sun;
   wherein the at least one FCC is further configured to adjust the airspeed of the first UAV to the first airspeed and adjust the angle of the first UAV to the first angle while traveling toward the Sun;
   wherein the at least one FCC is further configured to adjust the airspeed of the first UAV to the second airspeed and adjust the angle of the first UAV to the second angle while traveling away from the Sun;
   wherein the solar array is disposed on an upper surface of a wing panel of the first UAV and is rearwardly angled in level flight due to a leading-edge-up attitude such that solar capture is primarily maximized when the UAV travels away from the Sun;
a battery pack system comprising:
   a battery configured to power the first UAV; and
   a power tracker in communication with the battery and the solar array, wherein the power tracker is configured to receive power from the solar array, wherein the power tracker is configured to supply an electrical charge of the received power from the solar array to the battery while regulating a steady battery-bus voltage despite variation in solar array output with Sun position; wherein the power tracker is configured to taper charging, responsive to at least one of: a battery temperature and an upper-voltage limit, by adjusting a boost ratio and by commanding a propulsion system of the first UAV to absorb surplus current while maintaining the steady battery-bus voltage.

2. The system of claim 1, wherein the first angle is substantially parallel to the horizontal plane.

3. The system of claim 1, wherein the second angle causes the UAV to tilt up such that the solar array is closer to perpendicular to a Sun's rays.

4. The system of claim 1, wherein the solar array is disposed on an upper surface of a wing panel of the UAV.

5. The system of claim 1 further comprising:
at least one computing device associated with a ground control station, wherein the at least one computing device is in communication with the at least one FCC.

6. The system of claim 5, wherein the at least one computing device is configured to:
transmit a communication signal to the at least one FCC.

7. The system of claim 6, wherein the transmitted communication signal includes a command for the at least one FCC to adjust the UAV airspeed based on the direction of travel of the at least one UAV relative to the Sun.

8. The system of claim 6, wherein the transmitted communication signal includes a command for the at least one FCC to adjust a UAV angle based on the direction of travel of the at least one UAV relative to the Sun.

9. The system of claim 1, wherein the at least one FCC is further configured to sustain flight of the UAV throughout the night via energy stored in one or more batteries when there is no solar capture of the solar array, and wherein the power tracker is further configured to terminate the electrical charge to the battery when a predetermined upper voltage limit is met to limit time that the battery is spent at high states of charge to preserve a life span of the battery.

10. A method, comprising:
determining, by at least one flight control computer (FCC) associated with at least one UAV, a direction of travel of a first UAV of the at least one UAV relative to a Sun;
adjusting, by the at least one FCC, an airspeed of the first UAV to a first airspeed if the determined direction of travel of the first UAV is towards the Sun; and
adjusting, by the at least one FCC, the airspeed of the first UAV to a second airspeed if the determined direction of travel of the first UAV is away the Sun;

adjusting, by the at least one FCC, an angle of the first UAV to a first angle relative to a horizontal plane if the determined direction of travel of the first UAV is towards the Sun; and adjusting, by the at least one FCC, the angle of the first UAV to a second angle relative to the horizontal plane if the determined direction of travel of the first UAV is away from the Sun;

wherein the angle of the first UAV is relative to a plane of the first UAV parallel to an upper surface of the first UAV, wherein the first angle is substantially parallel to the horizontal plane, wherein the second angle causes the first UAV to tilt up such that the solar array is closer to perpendicular to the Sun's rays;

controlling, by the at least one FCC, the first UAV to loiter within a set distance of a ground control station in a large-area D-loop flight pattern having portions toward the Sun and portions away from the Sun;

wherein the at least one FCC is further configured to adjust the airspeed of the first UAV to the first airspeed and adjust the angle of the first UAV to the first angle while traveling toward the Sun;

wherein the at least one FCC is further configured to adjust the airspeed of the first UAV to the second airspeed and adjust the angle of the first UAV to the second angle while traveling away from the Sun;

wherein the solar array is disposed on an upper surface of a wing panel of the first UAV and is rearwardly angled in level flight due to a leading-edge-up attitude such that solar capture is primarily maximized when the UAV travels away from the Sun;

capturing, by a solar array covering at least a portion of the first UAV, solar energy to propel the first UAV and charge a battery of the first UAV with the captured solar energy, wherein the battery is configured to power the first UAV;

receiving, by a power tracker in communication with the battery and the solar array, power from the solar array;

supplying, by the power tracker, an electrical charge of the received power from the solar array to the battery, wherein when the power tracker supplies the electrical charge of the received power to the battery while regulating a steady battery-bus voltage despite variation in solar array output with Sun position;

wherein the power tracker is configured to taper charging, responsive to at least one of: a battery temperature and an upper-voltage limit, by adjusting a boost ratio and by commanding a propulsion system of the first UAV to absorb surplus current while maintaining the steady battery-bus voltage;

wherein the first airspeed is greater than the second airspeed to maximize solar capture of the solar array.

11. The method of claim 10, wherein the first angle is substantially parallel to the horizontal plane.

12. The method of claim 10, wherein the second angle causes the UAV to tilt up such that the solar array is closer to perpendicular to a Sun's rays.

13. The method of claim 10, wherein the solar array is disposed on an upper surface of a wing panel of the UAV.

14. The method of claim 10, wherein at least one computing device associated with a ground control station is in communication with the at least one FCC.

15. The method of claim 14 further comprising:

transmitting, by the at least one computing device, a communication signal to the at least one FCC.

16. The method of claim 15, wherein the transmitted communication signal includes a command for the at least one FCC to adjust the UAV airspeed based on the direction of travel of the at least one UAV relative to the Sun.

17. The method of claim 15, wherein the transmitted communication signal includes a command for the at least one FCC to adjust a UAV angle based on the direction of travel of the at least one UAV relative to the Sun.

18. The method of claim 10, further comprising:

sustaining, by the at least one FCC, a flight of the UAV throughout a night via energy stored in one or more batteries when there is no solar capture of the solar array; and terminating, by the power tracker, the electrical charge to the battery when a predetermined upper voltage limit is met to limit time that the battery is spent at high states of charge to preserve a life span of the battery.

* * * * *